United States Patent [19]

Owen

[11] Patent Number: 5,241,691
[45] Date of Patent: Aug. 31, 1993

[54] METHOD OF OPTIMIZING THE TRANSMISSION OF IDLE BEACON MESSAGES AND A COMMUNICATIONS SYSTEM USING THE METHOD

[75] Inventor: Frank C. G. Owen, Petts Wood, England

[73] Assignee: U.S. Philips Corporation, New York, N.Y.

[21] Appl. No.: 661,034

[22] Filed: Feb. 25, 1991

[30] Foreign Application Priority Data

Mar. 9, 1990 [GB] United Kingdom ................ 9005290

[51] Int. Cl.⁵ ........................ H04B 7/26; H04B 17/00
[52] U.S. Cl. ................................ 455/54.2; 455/38.3; 455/63; 455/67.1; 455/343
[58] Field of Search ............... 455/32.1, 34.1, 38.1, 455/38.2, 38.3, 53.1, 54.1, 54.2, 63, 67.1, 68, 343; 379/58, 59, 63; 340/825.44; 370/95.3

[56] References Cited

U.S. PATENT DOCUMENTS

| | | | |
|---|---|---|---|
| 4,449,248 | 5/1984 | Leslie et al. | 455/53.1 X |
| 4,964,121 | 10/1990 | Moore | 455/343 X |

FOREIGN PATENT DOCUMENTS

| | | | |
|---|---|---|---|
| 0115139 | 8/1984 | European Pat. Off. | |
| 0175530 | 7/1988 | Japan | 455/343 |
| 0265732 | 10/1989 | Japan | 455/38.3 |
| 2174573A | 11/1986 | United Kingdom | |
| WO86/00486 | 1/1986 | World Int. Prop. O. | |

Primary Examiner—Reinhard J. Eisenzopf
Assistant Examiner—Chi Pham
Attorney, Agent, or Firm—David R. Treacy

[57] ABSTRACT

A time division communications system for radio communication between primary stations and a plurality of secondary stations, having a normal idle beacon message transmitted by the primary station when it has an otherwise idle period. To reduce interference with stations in adjacent areas, and power consumption, during long idle periods the primary station ascertains whether secondary stations which are in range are experiencing sufficiently low interference that the primary station can switch to a low duty cycle link mode. In the low duty cycle mode paging messages are transmitted as required, and low duty link reassurance messages are transmitted at relatively long intervals. If either the primary or secondary stations detect sufficient increase in interference, the system reverts to the normal idle state.

15 Claims, 3 Drawing Sheets

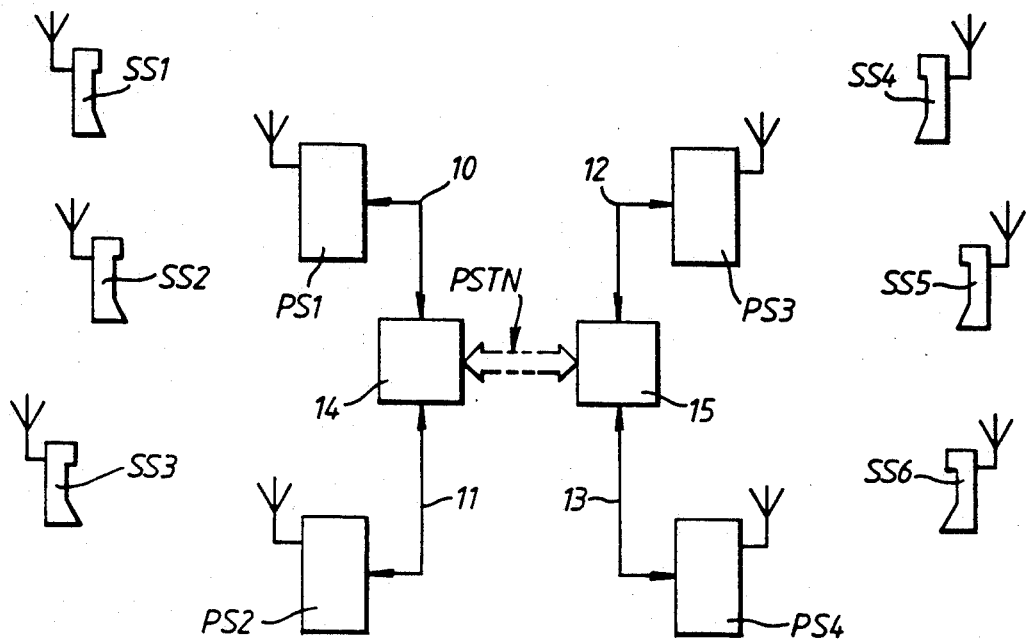
Fig. 1.
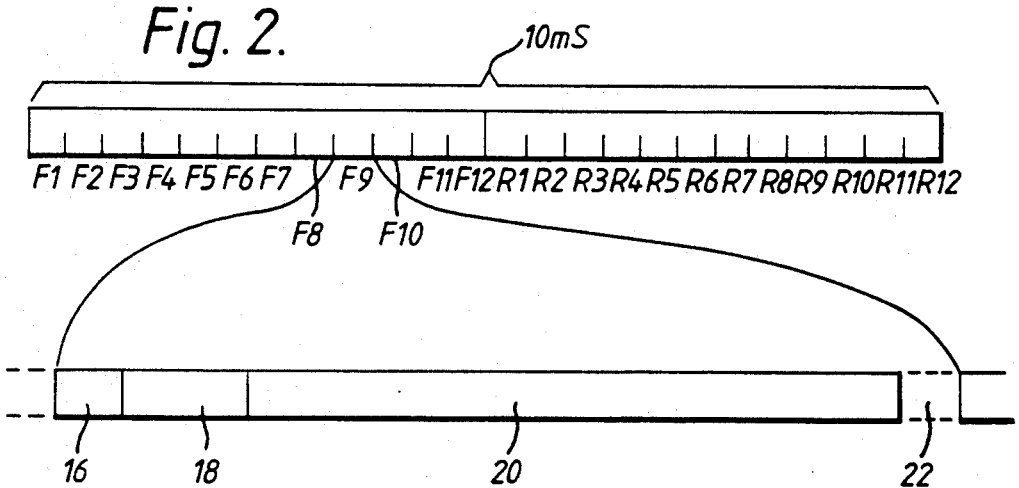
Fig. 2.
Fig. 3.

METHOD OF OPTIMIZING THE TRANSMISSION OF IDLE BEACON MESSAGES AND A COMMUNICATIONS SYSTEM USING THE METHOD

BACKGROUND OF THE INVENTION

The present invention relates to a method of optimising the transmission of idle beacon messages in a communications system, and particularly but not exclusively, in a system having a time division duplex (TDD) frequency channel, for example in a digital cordless telephone system having time division multiple access (TDMA) protocol and also a communications system operable in accordance with the method, and to a primary and a secondary station for use in the communications system.

An example of such a communications system is the Digital European Cordless Telecommunications (DECT) system, the specification for which is currently being drafted by the European Telecommunications Standards Institute (ETSI). DECT comprises, for voice communication, one or more primary or fixed base stations which are connected by wire to the PSTN and one or more secondary or transportable, for example hand portable, stations which communicate by way of a radio link with a primary station. In a domestic environment there may be one secondary station to each primary station but in the case of a block of flats or an office environment a plurality of secondary stations will be capable of communicating via a respective primary station. In the case of DECT there are ten radio or frequency channels, and each is divided into frames of 10 milliseconds duration. Each frame is divided into 24 equal time slots (or physical channels) which comprise 12 time division duplex (TDD) channels termed duplex channels. The TDD arrangement is such that the nth and the (n+12)th time slots, where n is an integer between 1 and 12, are the forward and reverse physical channels constituting the duplex channel. Each pair of physical channels is capable of carrying one duplex digitised speech conversation or data at a rate of 1.152 Mbits/sec.

In setting up a voice call between a primary and a secondary station, a pair of physical channels is assigned to the transaction. The assignment of the pair of physical channels in any of the frequency channels is by the method of dynamic channel allocation whereby a secondary station taking into account its radio environment as determined by monitoring the average interference in each of the 120 pairs of physical channels negotiates with the primary station for access to the best pair of physical channels currently available under the control of the primary station.

There will be times, such as at night, when the base station is idle. Currently the DECT specification requires base stations to continue transmissions on their last active forward physical channel to provide the system functions of broadcasting the basic system information, base station identity and a frequency and frame timing reference. For convenience of description such transmissions will be called "normal idle beacon" transmissions. A secondary station in range of the primary station can remain tuned to the active forward physical channel but can power down. It wakes up to receive regular paging transmissions which are sent every 160 ms (or 16 frames) and to check every 2 or 5 seconds that it is correctly tuned to, and in synchronism with, the primary station. A reason given for having these normal idle beacon transmissions is that the system must be capable of setting-up a call with a secondary station already locked to a primary station within the guaranteed maximum connection time of 1.5 second specified by most telephone authorities. Therefore, a secondary station wishing to make a call must be able to scan the physical channels to obtain the best channel and then establish frame and slot synchronization using the normal idle beacon transmissions. These transmissions also enable the secondary station to save power by permitting them to power down. However, if it is quiet, these regular normal idle beacon transmissions generated every 10 ms can be a source of undesirable interference, in addition to being a waste of power. In fact some workers in the field of cordless telephones believe that base station interference in a residential area may limit the range of a secondary station because if it detects excessive interference on a channel it will search for an acceptable alternative channel. This task may be difficult if there are a relatively large number of nearby primary stations transmitting normal idle beacon signals.

SUMMARY OF THE INVENTION

An object of the present invention is to reduce primary station normal idle beacon transmissions during long quite or idle periods.

Another object of the present invention is to reduce the power consumption of the secondary stations during long quiet or idle periods.

According to one aspect of the present invention there is provided a method of optimising the transmission of idle beacon messages by a primary station in a multi-channel radio communications system comprising a primary station and a transportable secondary station. According to this method the primary station monitors the traffic history and local interference environment during an idle period. In response to the conditions of the primary station not having a radio link established with any secondary station after the expiry of the predetermined time interval and detecting a level of interference not exceeding a certain level, the primary station adopts a low duty cycle beacon mode in which the frequency of the transmitted idle beacon messages is less than the normal idle beacon transmissions transmitted by idle primary stations when said conditions have not been detected.

According to another aspect of the present invention a communications system comprises at least one primary station and at least one secondary station, the primary and secondary stations having transceiving means for establishing a radio link between a primary and a secondary station on one of a plurality of channels, means for scanning said plurality of channels, means for monitoring the traffic history in said channels and means for monitoring the local interference environment. Each primary station has means for determining the time elapsed since it last established a link with a secondary station and interference level determining means, and further includes means, responsive to determining that a link has not been established after the expiry of a predetermined time interval and to detecting that the level of surrounding interference has not exceeded a certain level, for transmitting a low duty cycle request message as a paging signal to in-range secondary station(s) inviting it (or them) to enter a low duty cycle beacon.

The invention is based on the fact that the primary station can, by monitoring the traffic history and local interference environment during an idle period, decide if the system has entered a long quiet period. If this is confirmed then the station can apply a low duty cycle protocol which suspends the transmission of the normal idle beacon signals leading in turn to a reduction in the primary station transmissions and reduced power consumption by the secondary stations. The protocol instils a degree of channel ordering or preference for a number of low duty cycle primary station-secondary station signalling links used during long periods of inactivity that occur in low traffic environments. Ordering is necessary to avoid low duty cycle links becoming corrupted by neighbouring interferers. Traffic densities must be extremely low otherwise any form of low duty cycle signalling link will generate, or be subject to, continual interference from neighbouring systems. When traffic densities increase beyond a predetermined level it will be necessary for the primary station to operate its normal idle beacon mode.

The present invention also relates to a secondary station and to a primary station for use in the telecommunications system.

The present invention will be described, by way of example, with reference to the accompanying drawing.

BRIEF DESCRIPTION OF THE DRAWING

FIG. 1 illustrates diagrammatically a digital cordless telephone system,

FIG. 2 is a diagram showing the DECT frame structure imposed on a frequency channel, FIG. 3 is a diagram of the DECT slot structure for voice signals.

DESCRIPTION OF THE PREFERRED EMBODIMENT

Figure 4:
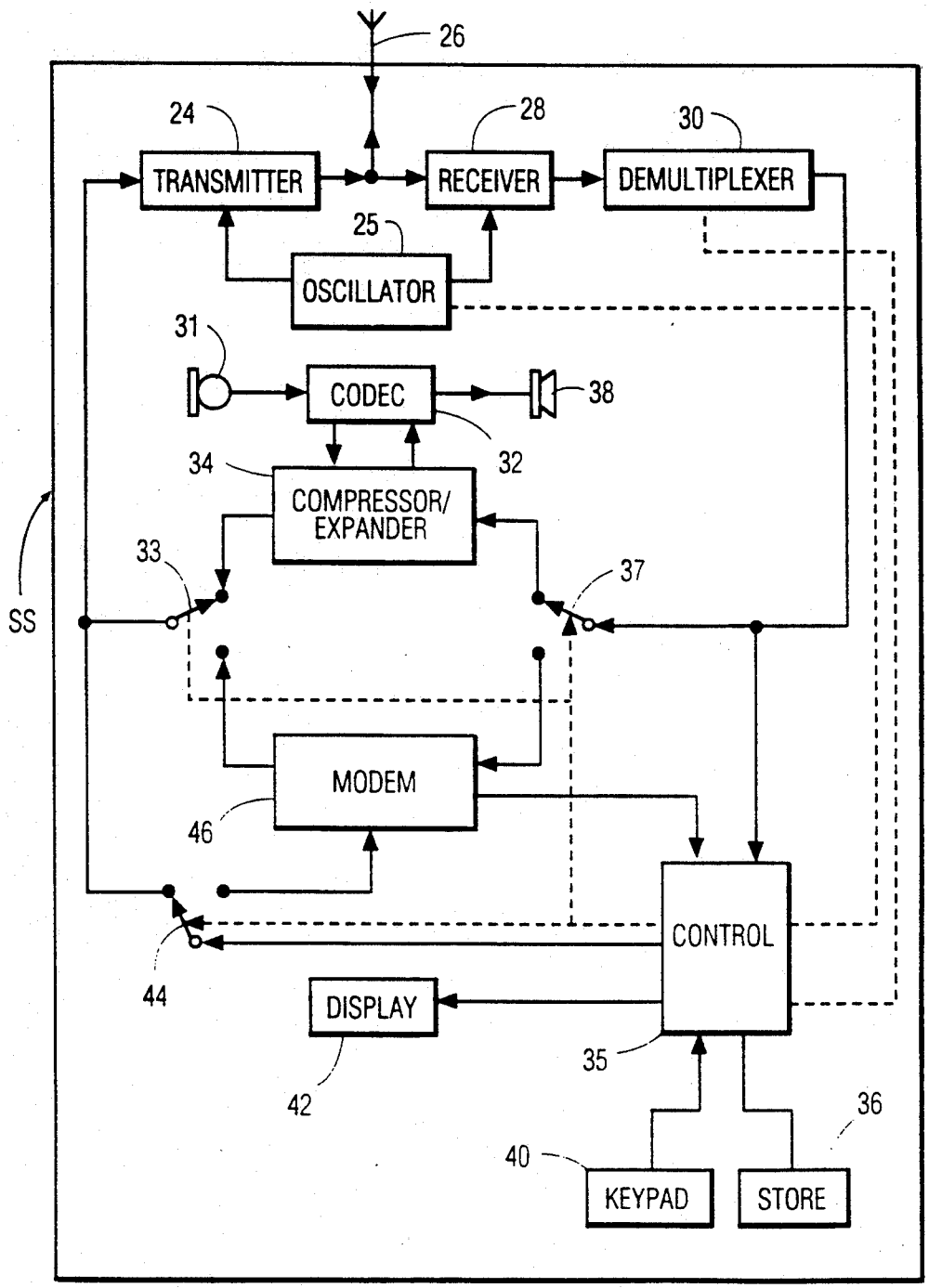
FIG. 4 is a block schematic diagram of a secondary station.

The digital cordless telephone system shown in FIG. 1 comprises a plurality of primary or fixed base stations PS of which four, PS1, PS2, PS3 and PS4, are shown. Each of the primary stations is connected by way of a respective wideband landline link 10, 11, 12 and 13, capable of carrying digitised speech or data at a rate of say 1,152 Mbits/sec. to cordless telephone system controllers 14 and 15. The system controllers 14 and 15 are, in the illustrated embodiment, connected to the PSTN.

The system further comprises a large plurality of transportable, for example hand portable, secondary stations SS1 to SS6 which in the illustrated embodiment are used for digital time division duplex speech communication. Duplex communication between the secondary stations within an area covered by a system controller and/or the PSTN is by way of radio through the primary stations PS. Accordingly the primary and secondary stations each comprise a radio transmitter and receiver.

Referring to FIG. 2, the frequency channel is divided in the time domain into 10 ms frames. Each frame is divided into 24 time slots or physical channels of which the first twelve F1 to F12 are allocated for transmission in a forward direction, that is from a primary station to a secondary station, and the second twelve R1 to R12 are allocated for transmission in the reverse direction. The forward and reverse physical channels are twinned, that is, the correspondingly number forward and reverse physical channels, for example F4, R4, comprise a twin which hereinafter will be referred to as a duplex voice channel. In setting-up a call between a primary and a secondary station, a duplex voice channel is assigned to the transaction. The assignment of the duplex voice channel in any of the frequency channels is by the method of dynamic channel allocation whereby a secondary station taking account of its radio environment negotiates with the primary station for access to the best duplex voice channel currently available under the control of the primary station. In DECT there are 10 frequency channels which means that they can provide 120 duplex voice channels altogether.

The general structure of a digitised speech segment occupying a time slot is shown in FIG. 3. The message structure comprises a synchronisation sequence 16, signalling data 18 and digitised speech 20. An interslot guard space 22 is also provided at the end of the message. The digitisation rate is 32 kbits/sec. Both the primary and secondary stations include a buffer to compress the speech digitised at 32 kbits/sec. into bursts of data at 1.152 Mbits/sec. so that it is suitable for transmission.

The basic protocol for a transmission which is to be initiated by a secondary station SS is for it to listen to all the reverse physical channels in each of the frequency channels and ascertain which reverse physical channels are busy and idle and the relative signal quality in these reverse physical channels and from the information derived the secondary station determines what it believes is the best duplex voice channel and transmits in its reverse physical channel to a particular primary station PS. The signalling details 18 in the message together with other details in the initial transmission are decoded and passed to the system controller 14 or 15 which sets-up the fixed network connection. The primary station confirms that the particular duplex voice channel has been assigned to the transaction.

In the forward direction, the primary stations send paging messages to the addressed secondary stations in, say, every sixteenth frame. Such an arrangement enables the secondary stations to "sleep" during at least the intervening fifteen frames thereby economising on power. An addressed secondary station in response to a paging request addressed to it will, unless a duplex voice channel has been assigned, transmit on the reverse physical channel of the best duplex voice channel.

Also during idle periods the primary station is required by the DECT system specification to continue transmissions in the forward physical channel of its last active duplex voice channel in what will be termed its normal idle beacon mode. The information transmitted includes basic system information including the base station identity and frequency and frame timing reference. Such system information is required by a secondary station when wishing to initiate a call.

In accordance with the present invention, it is proposed to reduce the number of transmissions in idle periods still further by providing a low duty cycle beacon mode. However, whenever the primary station and any secondary stations are operating in this low duty cycle beacon mode, they must be capable of returning to a normal idle beacon mode in anticipation of a call being requested and the system having to effect a connection involving secondary stations already locked to a primary station within the guaranteed time of 1.5 seconds.

In order for a primary station to switch from a normal idle beacon mode to a low duty cycle beacon mode two conditions have to be met. Firstly, the primary station has not had a radio link established with a secondary station for a predetermined time, for example 1 minute. Secondly, the primary station detects that the surrounding interference from neighbouring equipment is at a sufficiently low level that a reliable low duty cycle link can be established for the primary and secondary stations.

Assuming that these two conditions have been met, the primary station switches from transmitting its normal idle beacon information in every frame to transmitting a low duty cycle request (LDCR) message in the normal paging channel which occurs every 160 ms. The LDCR message, which will be received by the secondary stations monitoring that primary station, is an invitation to the receiving secondary station to enter a low duty cycle beacon mode.

The or each secondary station wishing to set up a low duty cycle link monitors the local interference levels and selects an empty reverse physical channel which it uses to transmit a low duty link request (LDLR) message in every frame for a period, say 200 ms, which is sufficiently long to allow the primary station to monitor all the reverse physical channels and identify each of the channels being used by the respective secondary stations for LDLR messages.

The primary station having received LDLR messages from all the secondary stations within range, replies to each secondary station on the forward physical channel selected by that station by transmitting a low duty link confirm (LDLC) message provided that the primary station also detects no interference on that forward physical channel. The LDLC message is transmitted for a predetermined number, for example three, frames.

A secondary station will monitor the primary station's LDLC transmission until it is complete in order to obtain a timing reference for future "wake-ups". In the event of a secondary station not detecting a LDLC message in the frame following its original request then it will energise its receiver to scan all the pairs of physical channels as the primary station may attempt to establish a low duty cycle link on another pair of physical channels. Failure of a secondary station to detect a LDLC message may be due to the primary station detecting excessive interference on the duplex voice channel selected by the secondary station when transmitting the original LDLR message. In such a situation, the primary station does not reply on the forward physical channel of that duplex voice channel but will select another empty duplex channel and address the secondary station. The primary station transmits further LDLR messages in every frame for a predetermined time for example 200 ms, on the newly selected duplex voice channel. A predetermined number, for example three, exchanges of LDLR messages are permitted before the low duty cycle link establishment is abandoned and the primary station and the secondary stations within range return to the normal idle beacon mode.

Assuming that a low duty cycle beacon mode is established, then at regular intervals, for example every 160 ms, the secondary station wakes up and listens for a primary station transmission on the low duty cycle link. The secondary station will expect to hear:

a) silence, as the primary station has nothing to transmit to that handset, b) a paging message, as there is an incoming call to that secondary station, c) a low duty link reassurance (LDLReas) message which can be used by the secondary station to reset timing information and remain confident that it is still in contact with the primary station, (the LDLReas message is transmitted at least once every 10 minutes), or d) a return to normal beacon (RTNB) message, as a primary station is either processing a call or interference levels are too high to support the low duty cycle links.

The protocol outlined above can be summarised in the following tabulated sequence of operations:

| Secondary Station | | Primary Station |
|---|---|---|
| | ← Normal Idle Beacon (transmitted every frame) | TIME ↓ |
| | ← Low Duty Cycle Request (LDCR) (broadcast on normal beacon) | |
| Iterative | Low Dyty Link Request (LDLR) (on selected channel for 200 ms) | |
| | ← Low Duty Link Confirm (LDLC) (on selected channel for 30 ms) | |
| | LOW DUTY CYCLE LINK ESTABLISHED | |
| | ← Secondary Station Page (transmitted as necessary) | |
| | ← Low Duty Link Reassurance (LDLReas) (transmitted at least every 10 minutes) | |
| | ← Return to Normal Idle Beacon (transmitted as necessary) | |

These operations can be implemented in software at both the primary and secondary stations.

Various exceptional situations may arise and the protocol can be adapted to cope with them.

In the event of a secondary station just coming into the range of a primary station and wanting to establish a low duty cycle link, it has to transmit the LDLR message, but because the secondary station has no proper knowledge of the primary station's frame timing, the LDLR is sent every 5 ms for 200 ms to ensure that the transmission will fall in the primary station's receive window.

If at any time after the low duty cycle link has been established a LDLReas message is not received when expected, then the secondary station will to back to generating LDLR transmissions on another duplex voice channel. If attempts continue to remain unsuccessful and there is no continuous beacon to lock to, then the secondary station may assume that it is out of range of an operational base station and could turn itself off or continue to monitor the channel every 10 minutes in the hope of detecting a LDLReas message.

If the traffic level detected by the primary station exceeds a certain level and due to interference it can no longer guarantee the availability of a low duty cycle link for long periods or alternatively there may be a large number of low duty cycle link re-establishments, the primary station in these cases commands all secondary station to return to the normal beacon protocol.

In the event of the low duty cycle link becoming corrupted at the secondary station due to interference, then it will detect a regular signal every 160 ms. If a secondary station detects and signal that it does not expect from the linked primary station, it will generate LDLR messages as described above.

Since the primary station monitors all duplex voice channels before assignment of the low duty cycle channel and generally the primary and secondary stations see the same interferer, not too many link re-establishments will occur at initial low duty cycle set-up. If a low duty cycle link cannot be agreed between a primary and a secondary station after a predetermined number, for example three, attempts, either at initial establishment or re-establishment, then the primary station will enter its normal idle beacon mode and inform all the other secondary stations accordingly.

All secondary stations linked to a primary station must signal their willingness to enter low duty cycle idle beacon mode. If one secondary station is unable to do so due to interference from a neighbouring system, then all must operate in a normal idle beacon mode. The secondary stations must determine whether initially a low duty cycle connection is suitable for their location and interference environment. FIG. 4 is a block schematic diagram of a secondary station SS suitable for use in the method and system in accordance with the present invention. The secondary station SS comprises a transmitter 24 connected to an antenna 26 which is also connected to a receiver 28. A demultiplexer 30 is included in the received signal circuit to separate a digitised speech signal from other data signals.

A microphone 31 is connected to a CODEC 32 which includes storage for the digitised speech. The CODEC 32 operates at 32 kbits/sec. The CODEC 32 is connected to a data compressor 34 which compresses the digitised speech into bursts having a data rate of the speech at 1.152 Mbits/sec. A control element 35 is provided which controls the operation and internal organisation of the secondary station and which has a store 36 connected to it for storing amongst other things details of the usage and quality of all the duplex voice channels. At the occurrence of a reverse time slot or physical channel in the best available duplex voice channel, as decided by the control element 35, a burst of compressed digitised speech is then relayed by way of a change-over switch 33 to the transmitter 24 whose frequency channel has been predetermined by the control element 35 applying control signals to a local oscillator 25 as part of the choice of the best available duplex voice channel.

The received digitised speech in the forward time slot or physical channel is relayed by way of a change-over switch 37 to the data compressor/expander 34 in which it is expanded to digitised speech having a data rate of 32 kbits/sec. and passed to the CODEC 32 and then to a loudspeaker or other audio transducer 38.

A keypad 40 is connected to the control element 35, for keying-in data such as a called party's telephone number. The control element 35 causes the keyed-in data to be displayed on a display device 42. The control element 38 also adds the necessary signalling to the keyed-in data which is conveyed by way of a change-over switch 44 to the transmitter 24.

The switches 33, 37 and 44 are controlled by the control element 35.

Assuming that the secondary station is operating in a normal idle beacon mode, at least its transmitter 24 and receiver 28 are powered down. At least the receiver is woken up by instructions generated by the control element 35 to listen for paging signals every 160 ms and to listen for frequency and framing information once in every 2 to 5 seconds. Such signals and information are detected by the demultiplexer 30 which passes the data signals to the control element 35 which in response thereto changes over the switches 33, 37 and 44. The signal and/or information is decoded in a MODEM 46 and the message information is supplied to the control element 35.

In the event of a primary station sending a LDCR message, this is relayed to the control element 35.

If a secondary station SS wishes to "converse" with the primary station in response to the received invitation signal, the control element 35 causes a LDLR message to be generated and be sent to the MODEM 46 by way of the switch 44. The modulated output from the MODEM 46 is supplied to the transmitter 24 by way of the switch 33. The transmitter 24 transmits the LDLR signal on the reverse physical channel of the duplex voice channel used by the primary station when sending the LDCR message.

The remainder of the message exchange takes place under the direction of the control element 35 which has been preprogrammed to carry out the sequence of operations mentioned above.

Figure 5:
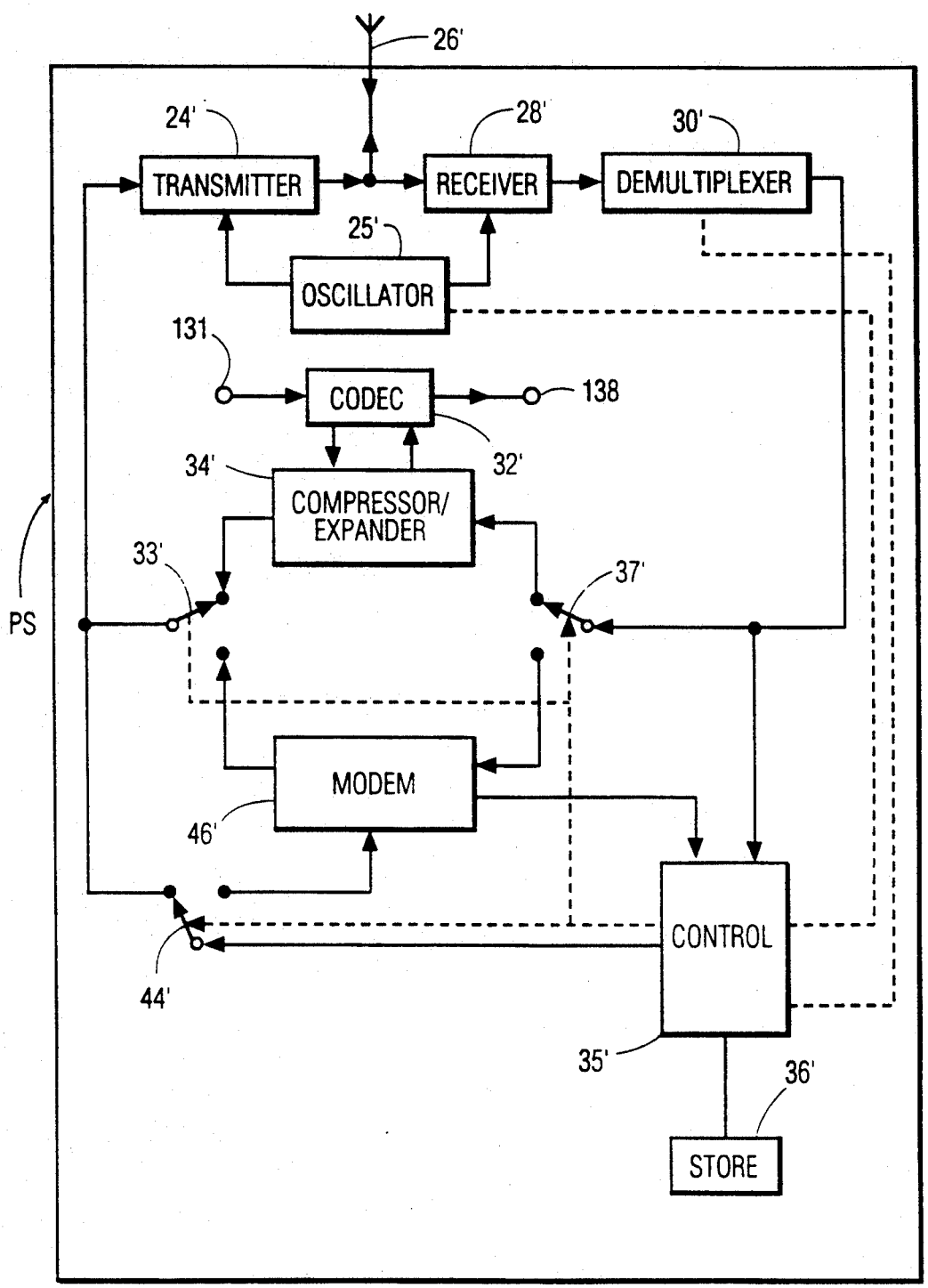
FIG. 5 is a block schematic diagram of a primary station.

The structure and operation of a primary station PS shown in FIG. 5 generally resembles that of the secondary station shown in FIG. 4. Similar elements have reference numerals the same as in FIG. 4 except for a "prime" designation. However, because the primary station is essentially a relay station interconnecting the PSTN connections 131 and 138 to the secondary station by way of an air interface, it does not require a microphone, loudspeaker and keypad. It does have a control element 35' which is programmed to carry out the setting-up of a low duty cycle beacon as well as all the other normal operations required of a primary station.

For convenience of description, the present invention has been described with reference to DECT. However, the method in accordance with the present invention may be used in other suitable systems.

From reading the present disclosure, other modifications will be apparent to persons skilled in the art. Such modifications may involve other features which are already known in the design, manufacture and use of digital cordless telephone systems and devices and component parts thereof and which may be used instead of or in addition to features already described herein. Although claims have been formulated in this application to particular combinations of features, it should be understood that the scope of the disclosure of the present application contains herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of optimizing the transmission of idle beacon messages by a primary station, in a communication system comprising a primary station and at least one transportable secondary station which communicates with the primary station over a radio link on one of a plurality of channels, where the primary station transmits normal idle beacon transmissions at a normal rate of repetition when the primary station has no radio link established with any secondary station, characterized by comprising performance of the following steps by the primary station:

monitoring said primary station's traffic history and the level of interference during an idle period.

responsive to said primary station's detecting the conditions that said station has not had a radio link established with any secondary station for the duration of a predetermined time interval, and that the level of interference does not exceed a given level, adopting a low duty cycle beacon mode in which the rate of repetition of transmitted idle beacon messages is less than the normal rate of repetition of normal idle beacon transmission by primary stations not detecting said condition.

2. A method as claimed in claim 1, characterised in that the primary station in response to detecting said conditions, transmits a low duty cycle request message as a paging signal, in that a secondary station in response to the receipt of the low duty cycle request message, transmits a low duty link request message over a time interval at least equal to the length of time required by the primary station to monitor all the available channels, and in that the primary station sends a low duty link confirm signal to each secondary station which has transmitted a low duty link request message, provided that excessive interference is not detected on the respective channel.

3. A method as claimed in claim 2, characterised in that each secondary station, responsive to not receiving a low duty link confirm signal within a predetermined time, scans available channels in order to try to set-up a low duty cycle link on another channel.

4. A method as claimed in claim 1, characterised in that, when the primary station is operating in the a low duty cycle beacon mode, it transmits low duty link reassurance signals at predetermined intervals.

5. A method as claimed in claim 2, characterised in that a secondary station, coming into range of the primary station while said primary station is operating in the low duty cycle beacon mode, and wanting to establish a similar link with the primary station, transmits a low duty cycle request message at regular intervals over a time period which exceeds the time required by the primary station to monitor all the available channels.

6. A method as claimed in claim 3, characterised in that a secondary station, coming into range of said primary station while said primary station is operating in the low duty cycle beacon mode, and wanting to establish a similar link with the primary station, transmits a low duty cycle request message at regular intervals over a time period which exceeds the time required by the primary station to monitor all the available channels.

7. A method as claimed in claim 3, characterised in that, when the primary station is operating in the low duty cycle beacon mode, it transmits low duty link reassurance signals at predetermined intervals.

8. A method as claimed in claim 7, characterised in that a secondary station, coming into range of said primary station while said primary station operating in the low duty cycle beacon mode, and wanting to establish a similar link with the primary station, transmits a low duty cycle request message at regular intervals over a time period which exceeds the time required by the primary station to monitor all the available channels.

9. A method as claimed in claim 2, characterised in that, when the primary station is operating in the low duty cycle beacon mode, it transmits low duty link reassurance signals at predetermined intervals.

10. A method as claimed in claim 9, characterised in that a secondary station coming into range of the primary station while said primary station is operating in the low duty cycle beacon mode and wanting to establish a similar link with the primary station, transmits a low duty cycle request message at regular intervals over a time period which exceeds the time required by the primary station to monitor all the available channels.

11. A communications system comprising a primary station and at least one transportable secondary station which communicates with the primary station over a radio link on one of a plurality of channels, the primary station and each secondary station each including a respective transceiver for establishing a radio link on one of said channels, and each transceiver comprising means for scanning said plurality of channels and means for monitoring each respective level of interference, wherein said primary station comprises means for controlling its transceiver to transmit paging signals, and to transmit normal idle beacon transmissions at a normal rate of repetition when the primary station has no radio link established with any secondary station, characterized in that said primary station further comprises means for monitoring the traffic history in said channels, means for determining the time elapsed since said primary station last established a link with a secondary station, and means, responsive to said primary station's detecting the conditions that said station has not had a radio link established with any secondary station for the duration of a predetermined time interval, and that the primary station's level of interference does not exceed a given level, for transmitting a low duty cycle request message as a paging signal.

12. A system as claimed in claim 11, characterized in that the secondary station comprises means responsive to the receipt of a low duty cycle request message for selecting a physical channel and for transmitting a low duty cycle link request message over a predetermined time interval, and in that the primary station comprises means responsive to the receipt of the low duty cycle link request message for transmitting a low duty link confirm signal.

13. A system as claimed in claim 12, characterised in that each secondary station comprises timing means, responsive to failure of the respective secondary station to receive a low duty link confirm signal within a predetermined time, for initiating scanning of at least a plurality of said plurality of channels to determine levels of interference on respective channels, and for initiating transmission of a low duty cycle link request message on an acceptable channel.

14. A system as claimed in claim 13, characterized in that said primary station includes means, responsive to receipt of a low duty cycle link request message, for generating a low duty link reassurance signal at predetermined intervals.

15. A primary station for use in a communications system comprising at least one transportable secondary station which communicates with the primary station over a radio link on one of a plurality of channels, the primary station including a transceiver for establishing a radio link on one of said channels, said transceiver comprising means for scanning said plurality of channels and means for monitoring the primary station's level of interference, wherein said primary station comprises means for controlling its transceiver to transmit paging signals, and a control element for controlling the primary station to transmit normal idle beacon transmissions at a normal rate of repetition when the primary station has no radio link established with any secondary station, characterized in that said control element further comprises means for monitoring the traffic history in said channels, means for determining the time elapsed since said primary station last established a link with a secondary station, and means, responsive to said primary station's detecting the conditions that said station has not had a radio link established with any secondary station for the duration of a predetermined time interval, and that the level of interference does not exceed a given level, for transmitting a low duty cycle request message as a paging signal.

* * * * *